June 2, 1953  D. K. MacBAIN  2,640,491
VALVE
Filed Jan. 7, 1950  2 Sheets-Sheet 1

INVENTOR.
DONALD KEITH MacBAIN
BY Wm Edward Hann
Attorney

June 2, 1953   D. K. MacBAIN   2,640,491
VALVE
Filed Jan. 7, 1950   2 Sheets-Sheet 2
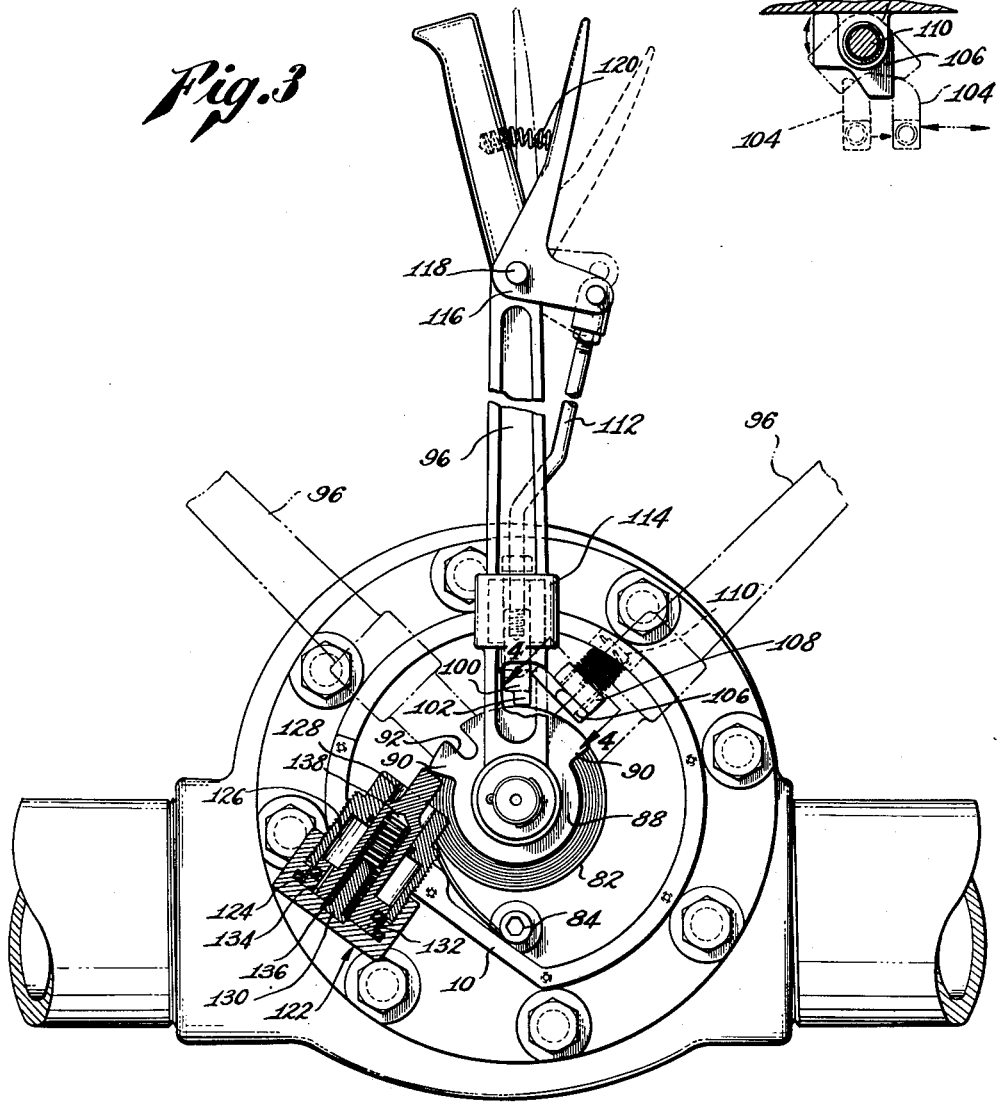
INVENTOR.
DONALD KEITH MacBAIN
BY Wm Edward Hann
Attorney Patented June 2, 1953

2,640,491

UNITED STATES PATENT OFFICE 2,640,491

VALVE

Donald Keith MacBain, Long Beach, Calif., assignor to Dr. Paul A. Dewhirst, Los Angeles, Calif.

Application January 7, 1950, Serial No. 137,356

5 Claims. (Cl. 137—75)

This invention relates to a valve construction and more particularly to a valve provided with an automatic emergency closing means.

The valve disclosed herein is similar in general structure to those disclosed in my co-pending applications, Serial No. 137,354, filed January 7, 1950, and Serial No. 137,355 filed January 7, 1950.

It is an object of the present invention to provide a valve structure which is adapted for use in connection with liquid lines such as oil and gasoline lines or in lines conducting corrosive or otherwise dangerous chemicals wherein means is provided for automatically closing the valve and the line in the event of fire.

Another object of the invention is to provide a valve which includes manual and automatic closing means wherein the automatic control is operative in response to high temperatures to close the valve and wherein it can be manually closed without interfering with the automatic mechanism.

The above and other objects and advantages will appear from the following description made in connection with the accompanying drawings wherein:

Fig. 3 is a side elevational view of the operating mechanism portion of the valve with the cover plate removed and the buffer in section; and Fig. 4 is a fragmentary detail of the handle latch showing portions thereof in alternate positions in full and dotted lines.

Figure 1:
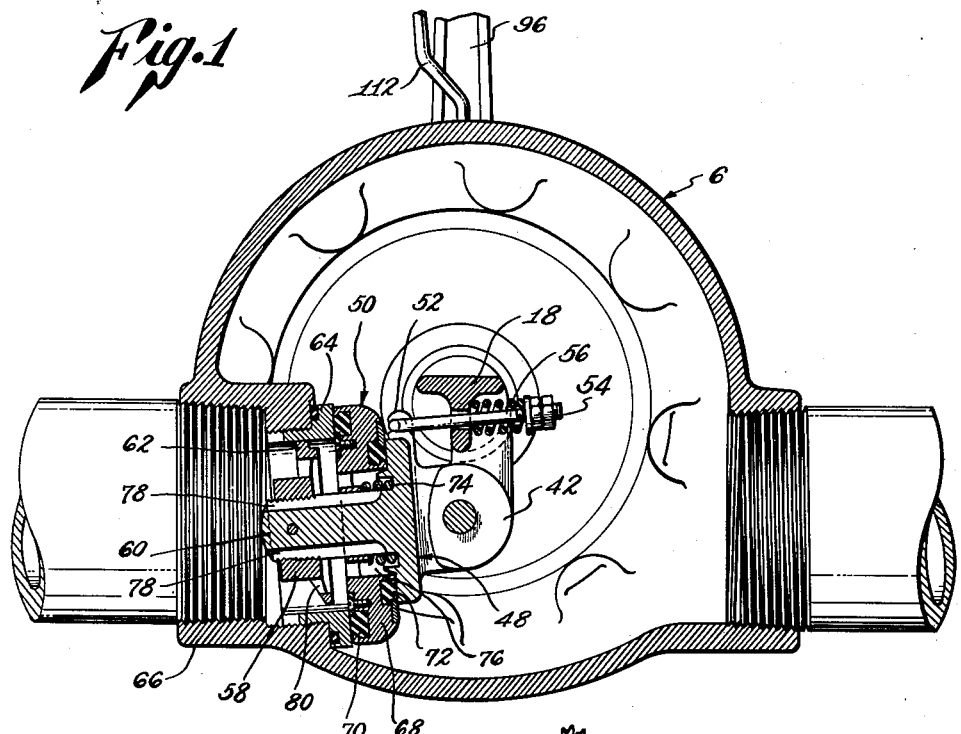
Fig. 1 is a longitudinal vertical sectional view through the valve chamber per se.
Figure 2:
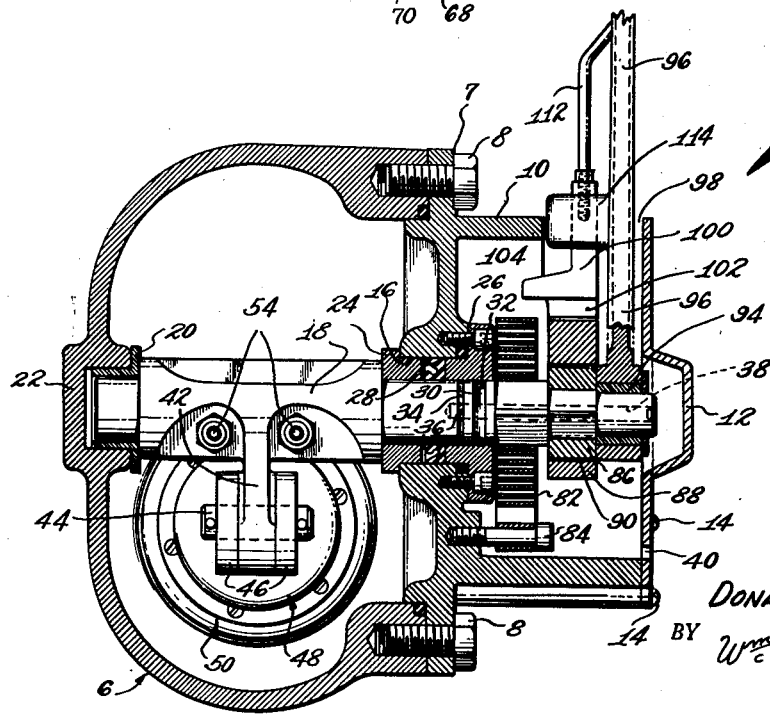
Fig. 2 is a transverse vertical sectional view through the entire assembly including the operating mechanism.

The structure includes a main casing 6 having a removable side plate 7 secured thereto by studs 8. The side plate 7 supports a housing 10 having a removable cover plate 12 secured by studs 14.

The side plate 7 is provided with a central aperture 16 through which passes a valve head supporting shaft 18. One end of this shaft is journaled in a bushing 20 which lies in a socket 22 in one side of the main casing 6.

Where the shaft 18 passes through the side plate 7 it is supported by corrosive resistant bushings 24 and 26 between which is located a sealing ring 28.

Lying in a groove 30 in the shaft 18 is an O-ring 32 and between this ring and the sealing ring 28 is a collector channel 34. It communicates with a small lateral bore 36 which in turn is connected with an axial bore 38 which extends to the outer end of said shaft 18. This provides means for carrying off liquids which might leak by the sealing ring 28 and otherwise encounter and damage the operating mechanism located in the housing 10, particularly when a corrosive liquid is being handled. Any liquid which flows from the axial bore 38 is conducted from the housing 10 through a drain aperture 40 in the housing side plate 12.

The shaft 18 has an offset ear 42 which is pivotally connected by a pin 44 to a pair of lugs 46 on a valve head casting 48. The casting 48 forms part of a valve head unit 50. The casting 48 is provided with a pair of upwardly extending lugs 52 engaged by a U-bolt 54 which passes through the shaft 18. A spring 56 on the U-bolt 54 normally maintains the lugs 52 in engagement with the shaft 18 when the valve unit 50 is moved away from its closed position.

The valve unit 50 includes an apertured disc 58 threaded on an extension 60 of the casting 48. The disc 58 has an upper portion 62 which is adapted to enter the aperture of a valve seat ring 64, said ring being threaded into a valve casing outlet connection 66.

The valve unit 50 includes a disc 68 slidable on the extension 60 and provided with oppositely facing sealing rings 70 and 72 which are adapted to seat respectively with the valve seat 64 and the left hand face of the valve casting 48. A spring 74 yieldably urges the disc 50 toward the apertured disc 58. When the disc 68 lies against the disc 58 flow is permitted between the disc 68 and the casting 48 through apertures 76 in the disc 68 and thence through longitudinal channels 78 in the casting extension 60. Flow is also permitted through apertures 80 in the disc 58.

When the valve is closed, contact is first made between the sealing ring 70 and the nearly vertical face of the valve seat 64. Then, as the valve is moved in a clockwise direction, the casting 48 will seat against the sealing ring 72 and completely shut off flow through the valve.

The above valve unit is more fully described in the above identified applications.

Lying about the shaft 18 in the housing 10 is a spiral spring 82 having its inner end suitably connected to the shaft and its outer end anchored to a stud 84 which is threaded into the casing side plate 7. Outwardly from the spring 82 on the shaft 18 is a collar 86 and that portion of the shaft which receives it is squared so the collar will rotate with it. Lying about the collar 86 is a collar 88 which is connected to said collar 86 by a layer of fusible bonding material 90.

The collar 88 as viewed in Fig. 3 is provided with an offset portion 90 having a notch 92 therein.

Journaled on a sleeve 94 on the end of the shaft 18 is a valve operating handle 96 which extends upwardly through an opening 98 in the housing 10. The handle 96 has a slidable dog 100 mounted thereon for movement longitudinally relative to the handle. The dog 100 is provided with a notch engaging portion 102 adapted to removably lie in the notch 92. The dog 100 also has a latch engaging lateral extension 104 adapted to engage a spring loaded latch element 106 pivotally mounted on lug 108 by means of a pin 110. The lug 108 is extended from the casing side plate 7.

The dog 100 is connected to the lower end of an operating rod 112 and slides vertically between guides 114 on the handle 96. The operating lever 112 has its upper end connected to the horizontal arm of a bell crank lever 116 which is pivotally mounted at 118 on the handle 96. The upper arm of the bell crank lever 116 is normally urged away from the handle 96 by means of a spring 120 which is interposed between said handle and the upwardly extending portion of the bell crank.

In Fig. 3 there is shown a buffer 122 in the form of a dashpot. It includes threadedly connected cylinder sections 124 and 126, the section 126 being threaded through a wall portion of the housing 10. The cylinder section 126 is provided with a bore 128 in which is slidably mounted a piston rod 130 having a head 132 thereon. The head has a bypass aperture 134 therethrough to permit the flow of liquid from one side of the piston head to the other. The outwardly extending end of the piston rod 130 bears against the offset 90 on the collar 88 and said piston rod is normally urged toward the offset 90 by means of a spring 136 which lies in a bore 138 in the piston rod and bears against the inner end portion of the cylinder section 124.

The valve is shown in its closed position in Fig. 1. To open the valve, the dog element 102 is registered with the notch 92 in the offset 90. The spring pressed dog portion will enter the notch whereupon the handle 96 can be swung from the left hand broken line position thereof in Fig. 3 to the right hand broken line position. This will swing the valve head unit 59 into the upper portion of the valve casing 6 so that liquids can freely flow through the casing. When the handle is swung to the open valve position, the catch 106 will engage the lateral projection 104 on the dog unit 100 and hold the operating handle in its open position.

When the valve is opened, as described above, the spring 82 will be loaded. The valve can be closed by pressing the upwardly extending arm of the bell crank 116 toward the handle 96, thereby lifting the lateral dog projection 104 above the catch 106 and simultaneously withdraws the dog element 102 from the notch 92, whereby the spring 82 will close the valve by rotating the shaft 18. As the valve approaches its closed position, the projection 90 on the collar 88 will engage the outwardly projected end of the piston rod 103 in the buffer 122 and the valve will be permitted to close without the hammering action which is frequently present in high pressure valves.

Assuming that the valve is open and held in that manner by the dog element 102 and the latch 106, the valve can be automatically closed in the event of high temperatures incident to fires. Predetermined temperatures will melt the fusible bond 99 between the concentric collars 86 and 88 on the shaft 18. This will permit the collar 86 to turn in the collar 88 so that the spring 82 will close the valve. Consequently, when highly inflammable liquids are being controlled, the flow will be shut off so that the adjacent fire will not be aggravated by reason of pipe breakage or other leakage when valves of this type are placed at strategic points in the flow line.

From the foregoing disclosure, it will be understood that various changes may be made in the form, details, arrangement and proportions of the various parts without departing from the spirit of the invention.

I claim as my invention:

1. In a valve structure, a body having a valve seat, a valve head supporting shaft rotatably supported by said body, a valve head on said shaft and positioned in said casing to swing into engagement with said seat, an operating member rotatably mounted on said shaft, a shaft locking element having a fusible connection with said shaft, a readily releasable connection between said operating member and said locking element, a stop device with which the operating member is releasably engageable to hold the operating member in a position whereby the valve head will be held open, and a power load unit connected to said shaft and yieldably urging said shaft in a rotational direction tending to close said valve head against said seat.

2. In a valve structure, a body having a valve seat, a valve head supporting shaft rotatably supported by said body, a valve head on said shaft and positioned in said casing to swing into engagement with said seat, an operating member rotatably mounted on said shaft, a shaft locking collar lying about said shaft, a fusible connection between said collar and said shaft, a releasable connection between said operating member and said locking collar, a stop device with which the operating member is releasably engageable to hold the operating member in a position whereby the valve head will be held open, and a power device connected to said shaft and yieldably urging said shaft in a rotational direction tending to close said valve head against said seat.

3. The structure in claim 2 and said locking collar having a stop thereon, and said rotatably mounted operating member having a locking element movably connected thereto and shiftable into and out of engagement with the stop on said locking collar.

4. The structure in claim 1 and said power load unit comprising a spiral spring element having one end connected to said shaft and extending thereabout, the other end of said spring being anchored.

5. The structure in claim 1, and said operating member comprising an end lever, and said releasable connection between said operating member and said locking element comprising a spring pressing pawl carried by said handle and shiftable into and out of engagement with said locking element.

DONALD KEITH MacBAIN.

References Cited in the file of this patent

UNITED STATES PATENTS

| Number | Name | Date |
|---|---|---|
| 1,039,693 | Burlingame | Oct. 1, 1912 |
| 1,081,822 | Ford | Dec. 16, 1913 |
| 1,515,081 | Toelle | Nov. 11, 1924 |
| 1,774,395 | Murray | Aug. 26, 1930 |
| 1,981,200 | Schultz | Nov. 20, 1934 |
| 2,128,059 | Siegert | Aug. 23, 1938 |